United States Patent
Kozaki et al.

(10) Patent No.: US 9,624,974 B2
(45) Date of Patent: Apr. 18, 2017

(54) MAGNETIC BEARING DEVICE AND VACUUM PUMP

(71) Applicant: SHIMADZU CORPORATION, Kyoto (JP)

(72) Inventors: Junichiro Kozaki, Kyoto (JP); Yoshihiro Nagano, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 541 days.

(21) Appl. No.: 14/156,764

(22) Filed: Jan. 16, 2014

(65) Prior Publication Data
US 2014/0212312 A1    Jul. 31, 2014

(30) Foreign Application Priority Data

Jan. 28, 2013 (JP) .................................. 2013-013295

(51) Int. Cl.
*H02K 7/09* (2006.01)
*F04D 19/04* (2006.01)
(Continued)

(52) U.S. Cl.
CPC ........ *F16C 32/0457* (2013.01); *F04D 19/042* (2013.01); *F04D 19/048* (2013.01); *F04D 29/058* (2013.01); *H02P 6/182* (2013.01); *H02P 21/24* (2016.02); *H02P 21/36* (2016.02); *H02K 7/09* (2013.01)

(58) Field of Classification Search
CPC .. F16C 32/04; F16C 32/0446; F16C 32/0451; F16C 32/0455; F16C 2360/044;
(Continued)

(56) References Cited

U.S. PATENT DOCUMENTS 5,844,339 A    12/1998    Schroeder et al.
6,515,388 B1    2/2003    Moriyama et al.
(Continued)

FOREIGN PATENT DOCUMENTS

CN    101785186 A    7/2010
JP    9-510280    10/1997
(Continued)

OTHER PUBLICATIONS

J-Plat Pat English Machine Translation, Ozaki et al. JP2009-375740, Nov. 2009.*
(Continued)

*Primary Examiner* — Burton Mullins
(74) *Attorney, Agent, or Firm* — Renner, Otto, Boisselle & Sklar, LLP

(57) ABSTRACT

A magnetic bearing device comprises a controller configured to obtain magnetic levitation information of the rotor shaft by AD sampling of current detection signals from the plurality of current sensors and a sum signal obtained by adding the pair of current detection signals relating to the pair of electromagnets, and perform PWM control of the excitation amplifiers based on the magnetic levitation information. The controller performs PWM control so that a length of one of an on-duty period and an off-duty period of the PWM carrier signal is always longer than a predetermined time period based on an attenuation characteristic of a spike noise produced in the electromagnetic current, and performs the AD sampling after the predetermined time period passes from starting timing of one of the on-duty period and the off-duty period.

7 Claims, 16 Drawing Sheets

(51) Int. Cl.
*F16C 32/04* (2006.01)
*F04D 29/058* (2006.01)
*H02P 6/182* (2016.01)
*H02P 21/24* (2016.01)
*H02P 21/36* (2016.01)

(58) Field of Classification Search
CPC .............. F16C 32/0406; F16C 32/044; F16C 32/0444; F16C 32/0474; F04D 19/042; F04D 27/001; F04D 29/058
USPC .............. 318/607, 606, 560, 599, 600, 601; 310/90.5
See application file for complete search history.

(56) References Cited

U.S. PATENT DOCUMENTS

| | | | | |
|---|---|---|---|---|
| 6,828,753 B2 * | 12/2004 | Grasso | .............. | H02M 7/53875 318/599 |
| 7,355,833 B2 * | 4/2008 | Kozaki | .................. | G01B 7/144 361/139 |
| 8,278,834 B2 | 10/2012 | Inamori | | |
| 2004/0183509 A1 | 9/2004 | Kawashima et al. | | |

FOREIGN PATENT DOCUMENTS

| | | |
|---|---|---|
| JP | 2001-140881 | 5/2001 |
| JP | 2001-177919 | 6/2001 |
| JP | 2009-275740 | 11/2009 |
| WO | WO 95/23297 A1 | 8/1995 |

OTHER PUBLICATIONS

English translation of Chinese Office Action dated Nov. 23, 2015 for corresponding Chinese Application No. 201310680615.9.
English translation of Chinese Office Action dated May 25, 2016 for corresponding Chinese Application No. 201310680615.9.
English translation of Japanese Office Action dated Sep. 6, 2016 for corresponding Japanese Application No. 2013-006575.

* cited by examiner

MAGNETIC BEARING DEVICE AND VACUUM PUMP

BACKGROUND OF THE INVENTION

1. Field of the Invention

The present invention relates to a magnetic bearing device having an actuator function and a sensing function, and a vacuum pump having such a magnetic bearing device.

2. Description of the Related Art

In a known constitution for vacuum pumps provided with a magnetic bearing device, in order to realize downsizing, price reduction, and reliability improvement, a position sensor for detecting levitation displacement of a rotor is not provided, and an electromagnet for generating a levitation controlling force serves a sensing function in addition to a conventional actuator function (see JP 2009-275740 A, for example).

In a conventional magnetic bearing device, an excitation current is supplied by applying a switching voltage from a PWM amplifier to an electromagnetic coil. In a magnetic bearing device having an actuator function and a sensing function, levitation position information of a rotor is obtained by detecting the electromagnetic current. When switching, as a spike-like noise due to a surge voltage or the like is produced in the electromagnetic current, a magnetic bearing device described in JP 2009-275740 A takes timing for sampling of a current at a middle point of voltage switching.

However, when on-duty is around 0% or around 100% in PWM control, next switching timing comes before a switching noise attenuates sufficiently. In such a case, even if the sampling is performed at a middle point in the voltage switching, an influence of a switching noise to the sampling is inevitable.

SUMMARY OF THE INVENTION

A magnetic bearing device comprises: a pair of electromagnets provided for each of a plurality of control axes so as to face against a rotor shaft; a plurality of excitation amplifiers configured to perform PWM control to a voltage applied to each of the electromagnets, and supply an electromagnetic current on which a sensor carrier signal for detecting a change of a levitation position of the rotor shaft is overlapped to each of the electromagnets; a plurality of current sensors each configured to detect the electromagnetic current; and a controller configured to obtain magnetic levitation information of the rotor shaft by AD sampling of current detection signals from the plurality of current sensors and a sum signal obtained by adding the pair of current detection signals relating to the pair of electromagnets, and perform PWM control of the excitation amplifiers based on the magnetic levitation information. The controller performs PWM control so that a length of one of an on-duty period and an off-duty period of the PWM carrier signal is always longer than a predetermined time period based on an attenuation characteristic of a spike noise produced in the electromagnetic current, and performs the AD sampling after the predetermined time period passes from starting timing of one of the on-duty period and the off-duty period.

Preferably the magnetic bearing device further comprises: a low-pass filter having a bandwidth higher than a PWM carrier frequency for the current detection signals. The controller performs AD sampling to the current detection signals that have passed through the low-pass filter.

Preferably the magnetic bearing device further comprises: a high-pass filter for removing a direct component from the sum signal. The controller performs AD sampling to the sum signal that has passed through the high-pass filter.

Preferably a frequency fpwm of the PWM carrier signal, a frequency fc of the sensor carrier signal, and a frequency fs of the AD sampling are set to be in a relation of integral multiple, and the controller performs AD sampling to the plurality of current detection signals and the sum signal relating to each of the plurality of electromagnet at once.

Preferably the PWM carrier frequency fpwm, the AD sampling frequency fs, and the sensor carrier frequency fc are set to be in a relation of fpwm>fs>fc.

A vacuum pump comprises: a pump rotor having an evacuating function section; a motor configured to drive the pump rotor to rotate; and the magnetic bearing device above described. The magnetic bearing device is configured to support a rotor shaft of the pump rotor in a magnetically levitated manner.

DETAILED DESCRIPTION OF PREFERRED EMBODIMENTS

Hereinafter, embodiments for carrying out the present invention will be described with reference to the drawings.

Figure 1:
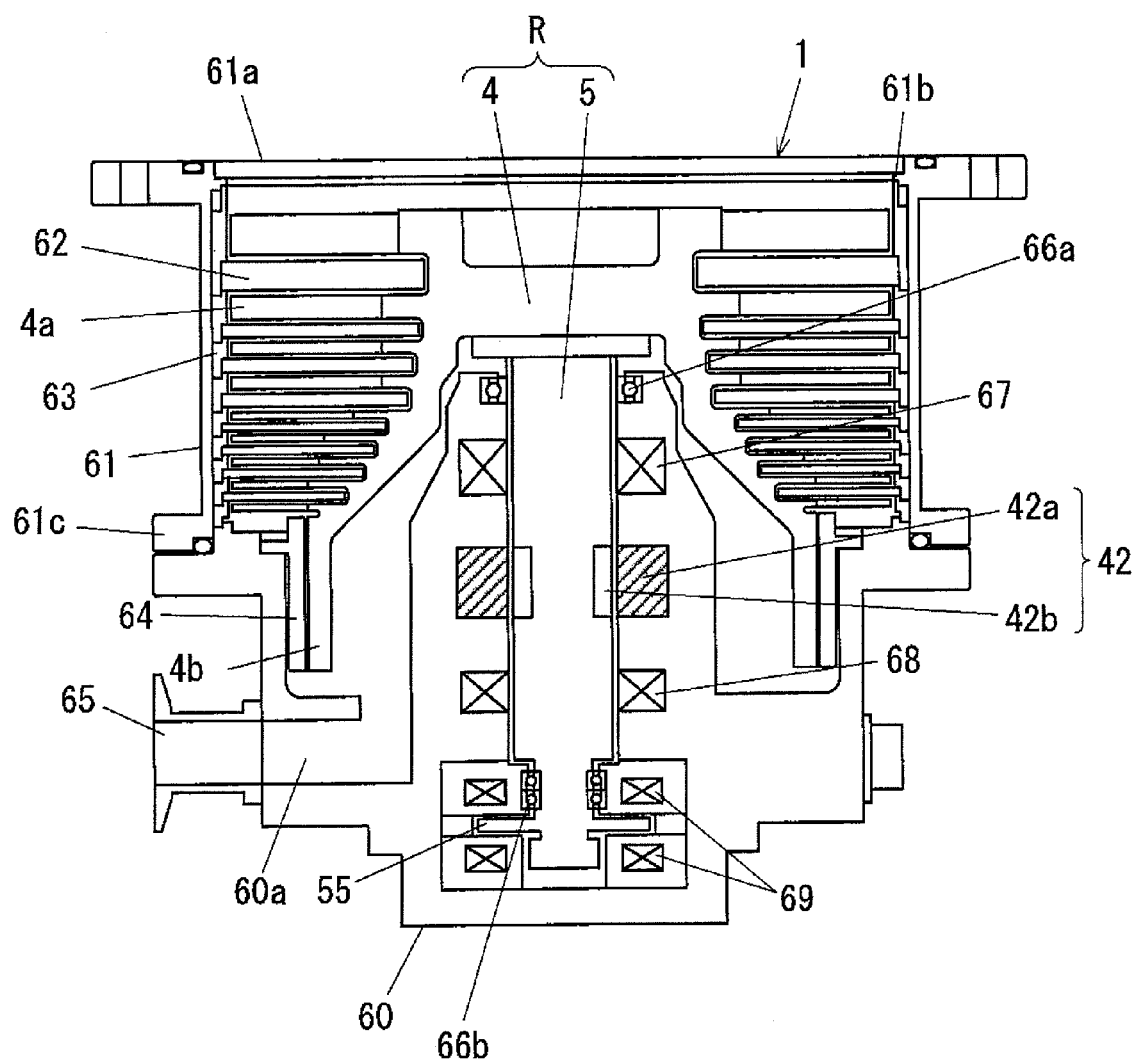
FIG. 1 is a diagram illustrating a schematic constitution of a vacuum pump.

FIG. 1 is a diagram illustrating a schematic constitution of a vacuum pump of this embodiment, and shows a sectional constitution of a pump unit 1 of a magnetic levitation style turbo-molecular pump. The turbo-molecular pump is provided with the pump unit 1 illustrated in FIG. 1, and a control unit (not depicted) configured to drive the pump unit 1.

The pump unit 1 has a turbo pump stage composed of rotor blades 4a and fixed blades 62, and a drag pump stage (a thread groove pump) composed of a cylindrical section 4b and a screw stator 64. In this case, the thread groove is formed on the side of the screw stator 64, but the thread groove may be formed on the side of the cylindrical section 4b. The rotor blade 4a and the cylindrical section 4b as a rotation-side evacuating function section are formed on a pump rotor 4. The pump rotor 4 is fastened to a shaft 5. The pump rotor 4 and the shaft 5 compose a rotor unit R.

The fixed blades 62 and the rotor blades 4a of a plurality of stages are arranged alternately with respect to an axial direction. Each of the fixed blades 62 is placed on a base 60 with a spacer ring 63 interposed therebetween. Upon fixation of a fixed flange 61c of a pump case 61 to the base 60 by a bolt, the stacked spacer rings 63 are held between the base 60 and a locking section 61b of the pump case 61 to position the fixed blades 62.

The shaft 5 is supported in a non-contact manner by magnetic bearings 67, 68, and 69 provided for the base 60. As will be described later, the magnetic bearings 67, 68, and 69 are self-sensing magnetic bearings that estimate change of a levitation position based on an electromagnetic current overlapped with a sensor carrier component. Here, an electromagnet composing the magnetic bearing 69 in an axial direction is disposed so as to sandwich a rotor disc 55 that is provided at a lower end of the shaft 5 in an axial direction. The shaft 5 is driven to rotate by a motor 42.

The motor 42 is a synchronous motor, and in this embodiment, a DC brushless motor is used. The motor 42 has a motor stator 42a disposed on the base 60, and a motor rotor 42b provided for the shaft 5. The motor rotor 42b is provided with a permanent magnet. When the magnetic bearings are not activated, the shaft 5 is supported by emergency mechanical bearings 66a and 66b.

An exhaust opening 60a of the base 60 is provided with an exhaust port 65, and a back pump is connected to the exhaust port 65. By driving the rotor unit R to rotate at high speed by the motor 42 while being magnetically levitated, gaseous molecules on the side of a suction port 61a are exhausted to the exhaust port 65.

Figure 2:
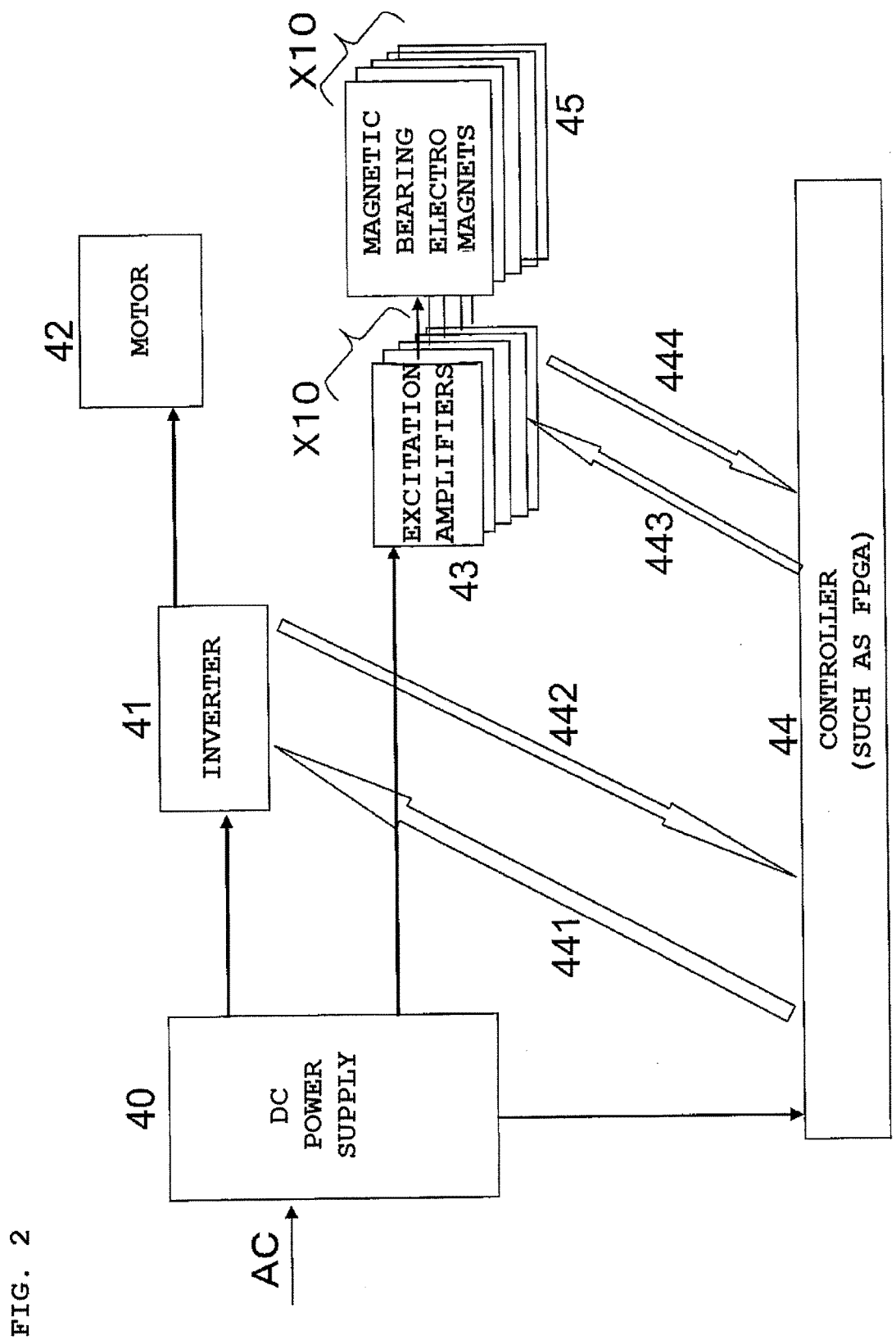
FIG. 2 is a block diagram illustrating a schematic constitution of a control unit.

FIG. 2 is a block diagram illustrating a schematic constitution of the control unit. An AC input from outside is converted into direct current from alternating current by a DC power supply 40 provided for the control unit. The DC power supply 40 generates electronic power for an inverter 41, electronic power for excitation amplifiers 43, and electronic power for a controller 44.

The inverter 41 that supplies a current to the motor 42 is provided with a plurality of switching elements. The motor 42 is driven by controlling ON/OFF of these switching elements by the controller 44.

Ten magnetic bearing electromagnets 45 illustrated in FIG. 2 represent magnetic bearing electromagnets provided for the magnetic bearings 67, 68, and 69. The magnetic bearings used in the turbo-molecular pump illustrated in FIG. 1 are 5-axis control magnetic bearings. The magnetic bearings 67 and 68 in a radial direction are 2-axis magnetic bearings, each provided with two pairs (four) of the magnetic bearing electromagnets 45. Further, the magnetic bearing 69 in an axial direction is a single-axis magnetic bearing, and provided with a pair (two) of the magnetic bearing electromagnets 45. The excitation amplifiers 43 that supply a current to the magnetic bearing electromagnets 45 are provided respectively for the ten magnetic bearing electromagnets 45, and the control unit is provided with total ten of the excitation amplifiers 43.

The controller 44 that controls driving of the motor 42 and the magnetic bearings is composed, for example, by a digital arithmetic unit such as an FPGA (Field Programmable Gate Array) and its peripheral circuits. The controller 44 outputs a PWM control signal 441 for controlling ON/OFF of the plurality of switching elements included in the inverter 41 to the inverter 41, and a PWM gate drive signal 443 for controlling ON/OFF of a switching element included in each excitation amplifier 43 to the excitation amplifiers 43. Further, as will be described later, a signal 442 relating to a phase voltage and a phase current relating to the motor 42, and an electromagnetic current signal 444 relating to the magnetic bearings are input into the controller 44.

Figure 3:
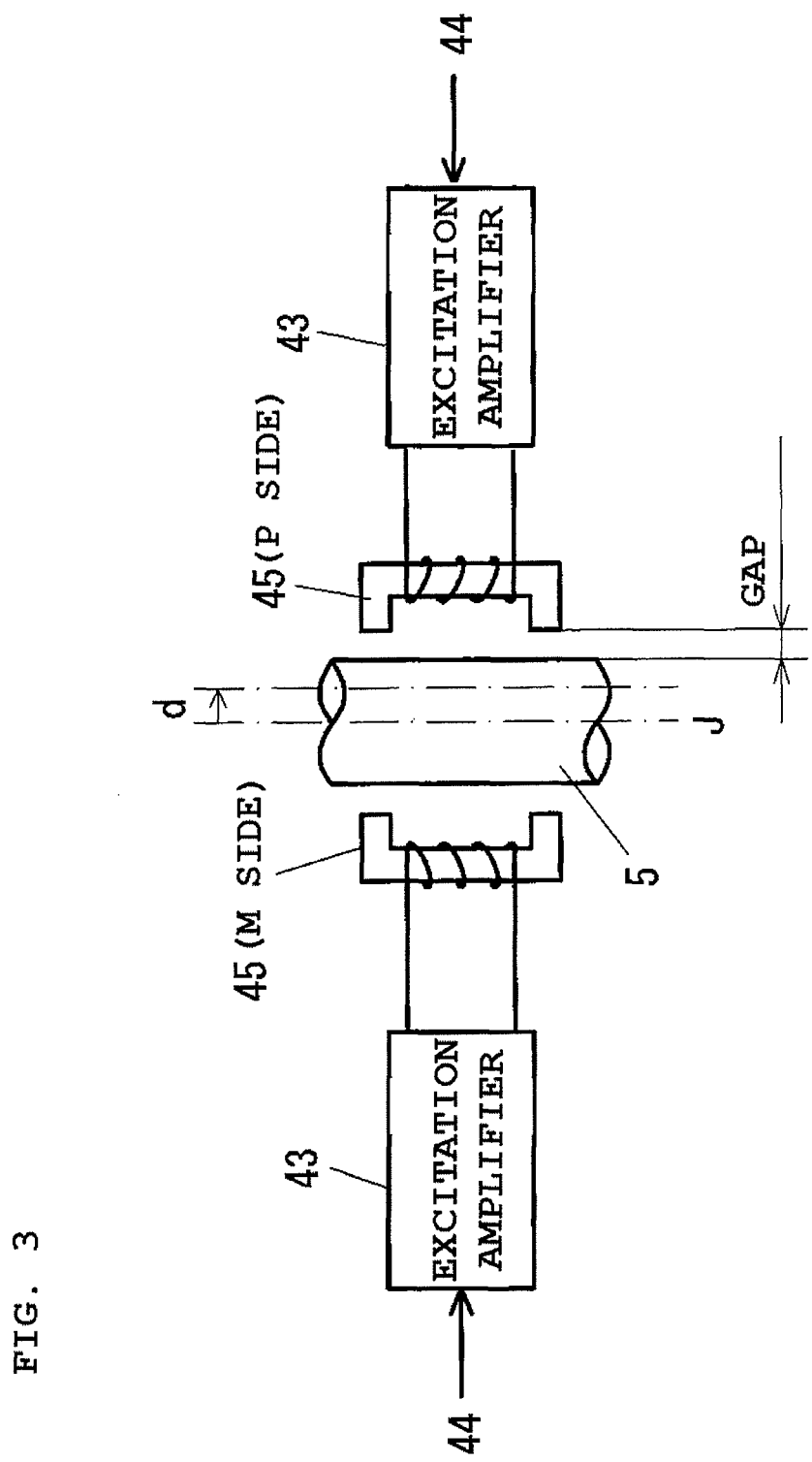
FIG. 3 is a diagram schematically illustrating magnetic bearing electromagnets 45 for a single axis provided for magnetic bearings 67 and 68.

FIG. 3 is a diagram schematically illustrating the magnetic bearing electromagnets 45 for a single control axis provided for the magnetic bearings 67 and 68. The two magnetic bearing electromagnets 45 are placed opposite to each other so as to sandwich a levitation central axis (levitation target position) J. As described above, the excitation amplifiers 43 are respectively provided so as to correspond to the magnetic bearing electromagnets 45. In FIG. 3, displacement d so as to approach the magnetic bearing electromagnet 45 on a P side (on the right side in the figure) is taken positive. The magnetic bearing electromagnet 45 with negative displacement is referred to as the magnetic bearing electromagnet 45 on an M side.

(Electromagnetic Currents Ip and Im)

According to the 5-axis control magnetic bearing of this embodiment, an electromagnetic current of each of the magnetic bearing electromagnets 45 includes, when dividing based on functions, a bias current ib, a levitation control current ic, and a current is of a sensor carrier component for positional detection. When a current flowing through the magnetic bearing electromagnet 45 on the P side is Ip, and a current flowing through the magnetic bearing electromagnet 45 on the M side is Im, an expression (1) listed below is established. A reference character isp indicates a sensor carrier component on the P side, and a reference character ism indicates a sensor carrier component on the M side. However, amplitude of isp and ism has reverse signs.

$$Ip = ib + ic + isp$$

$$Im = ib - ic + ism \quad (1)$$

The bias current ib is a direct current or in an extremely low frequency band, and used for biasing for a balance force with gravity acting on the rotor unit R, an improvement of linearity of a levitation force, and displacement sensing.

The levitation control current ic is a current used for a controlling force for making the shaft 5 (i.e., the rotor unit R) be levitated at a predetermined position. As the levitation control current ic changes as the levitation position changes, its frequency band is on the order of 1 kHz from the direct current.

The sensor carrier component is a current component used for detecting the levitation position displacement of the shaft 5 (i.e., the levitation position displacement of the rotor unit R). For the sensor carrier component is, a frequency in a frequency band from several kHz to several tens kHz (1 kHz<<fc<<100 kHz) is typically used in order to suppress an influence of the levitation controlling force as much as possible.

Generally, for magnetic bearings in industrial applications, a voltage-controlled PWM amplifier is employed as the excitation amplifiers 43. In other words, the electromagnetic current is controlled by controlling voltages applied to the electromagnetic coils of the magnetic bearing electromagnets 45.

As sensor carrier components vsp and vsm in voltages Vp and Vm applied to the electromagnetic coils are applied in phases opposite from each other, an expression (2) listed below is established. Here, $\omega c=2\pi fc$, and fc is a sensor carrier frequency. Further, t is time, and v is a constant amplitude value.

$$vsp=-v \times \sin(\omega c \times t)$$

$$vsm=v \times \sin(\omega c \times t) \qquad (2)$$

In the meantime, as a gap between the magnetic bearing electromagnets 45 and the shaft 5 (see FIG. 3) and inductance of the electromagnetic coils are inversely proportional to each other, an expression (3) listed below is established regarding inductance Lp and Lm of the electromagnetic coil on the P side and the electromagnetic coil on the M side. Here, D is a gap when the shaft 5 is at the levitation central axis (levitation target position), and d is displacement from the levitation target position. A is a constant.

$$1/Lp=A \times (D-d)$$

$$1/Lm=A \times (D+d) \qquad (3)$$

Regarding the sensor carrier components, a relation expressed by an expression (4) listed below is established between the voltages applied to the electromagnetic coils and the currents flowing through the electromagnetic coils. Here, a coil resistance is ignored.

$$vsp=Lp \times d(isp)/dt$$

$$vsm=Lm \times d(ism)/dt \qquad (4)$$

From the above expressions (2), (3), and (4), the sensor carrier components isp and ism of the currents flowing through the electromagnetic coils are expressed as in an expression (5) listed below. Here, $B=v \times A/\omega c$. In this manner, the sensor carrier components isp and ism are amplitude-modulated due to time change of the displacement d. On the other hand, for the bias current ib and the levitation control current ic, an influence of displacement variation may be ignored as their frequencies are low.

$$isp = -v \times \sin(\omega c \times t - \pi/2)/(\omega c + Lp)$$
$$= -B(D-d) \times \sin(\omega c \times t - \pi/2)$$

$$ism = v \times \sin(\omega c \times t - \pi/2)/(\omega c + Lm)$$
$$= B(D+d) \times \sin(\omega c \times t - \pi/2) \qquad (5)$$

As can be seen from the results described above, it is possible to obtain information of the displacement d by detecting the sensor carrier components isp and ism. Total currents Ip and Im flowing through the magnetic bearing electromagnets 45 on the P side and the M side are expressed as in an expression (6) listed below.

$$Ip=ib+ic-B(D-d) \times \sin(\omega c \times t-\pi/2)$$

$$Im=ib-ic+B(D+d) \times \sin(\omega c \times t-\pi/2) \qquad (6)$$

(Second Quadrant Excitation Amplifier)

Figure 4:
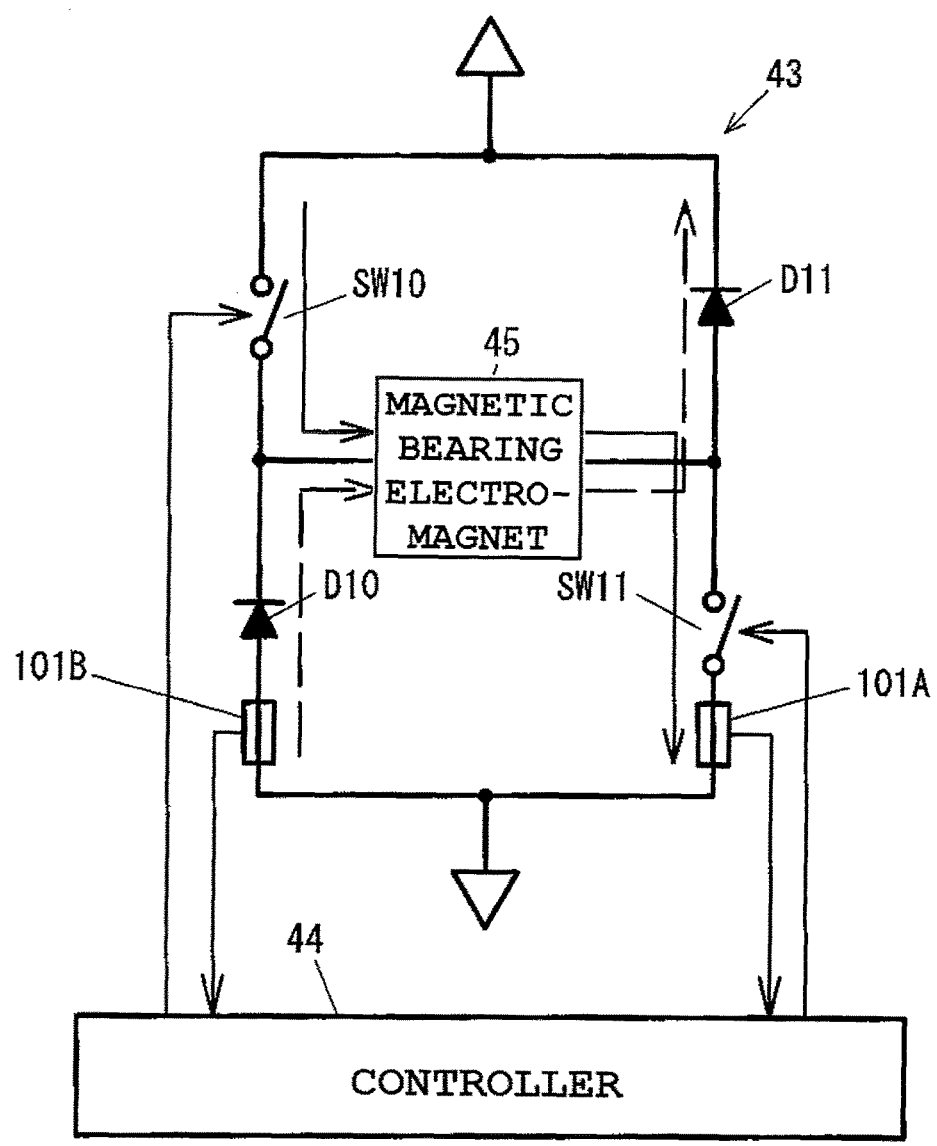
FIG. 4 is a diagram illustrating a constitution of an excitation amplifier 43.

FIG. 4 is a diagram illustrating a constitution of the excitation amplifiers 43 provided corresponding to the magnetic bearing electromagnets 45. Each excitation amplifier 43 is composed such that two sets of a switching element and a diode that are series connected are connected parallely. The magnetic bearing electromagnet 45 is connected between a switching element SW10 and a diode D10, and a switching element SW11 and a diode D11.

To the switching elements SW10 and SW11, a PWM control signal for controlling the bias current ib, the levitation control current ic, and the sensor carrier component is (the PWM gate drive signal 443 in FIG. 2) is input as a gate signal (gate drive voltage) from the controller 44. The switching elements SW10 and SW11 are turned ON/OFF at the same time. When the both elements are ON, currents (the currents Ip and Im described above) flow as indicated by solid arrows, and when the both elements are OFF, the currents (the currents Ip and Im described above) flow as indicated by dashed arrows. A value of the current when ON is measured by a current sensor 101A, and a value of the current when OFF is measured by a current sensor 101B. As the current sensors 101A and 101B, a shunt resistance is used, for example, and a voltage of the shunt resistance is used as a current detection signal. The current detection signal is input to the controller 44.

Figure 5:
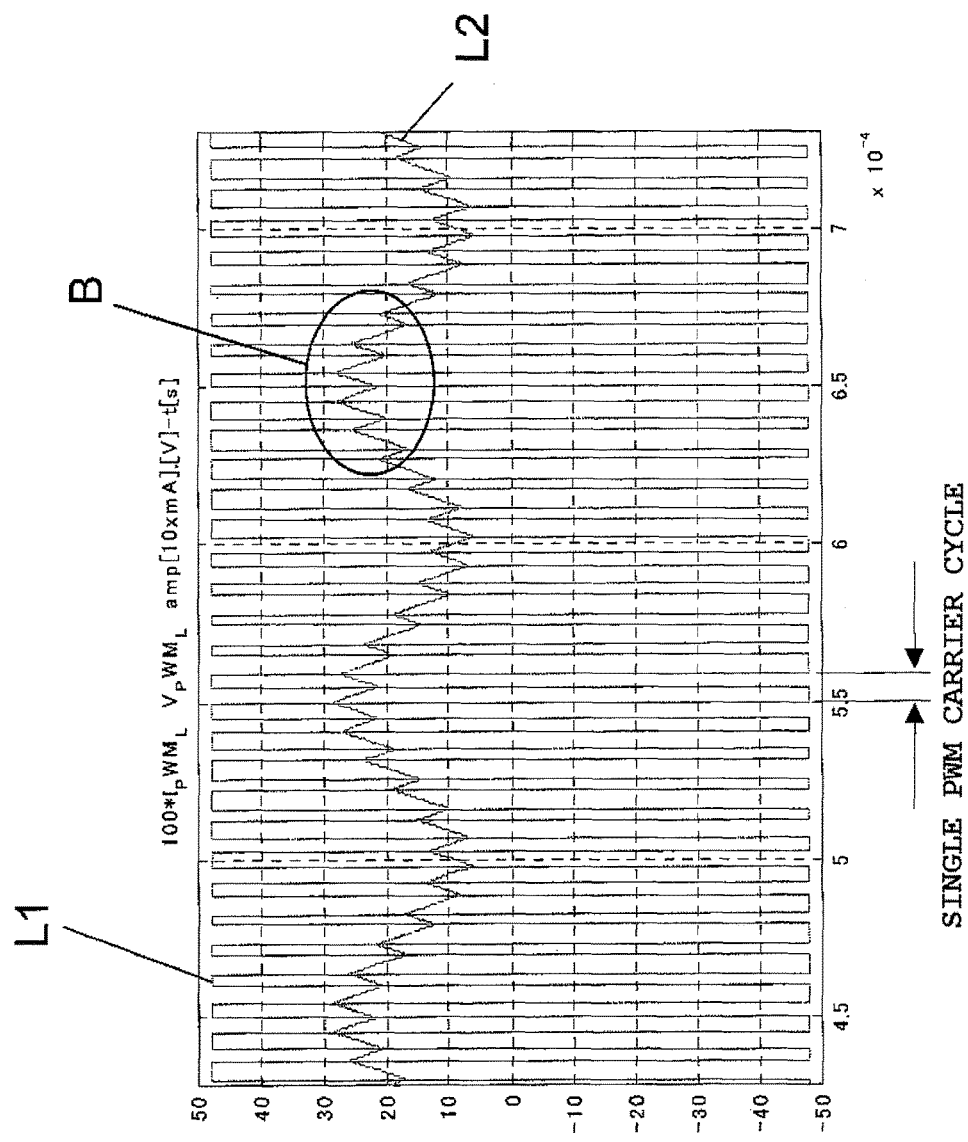
FIG. 5 is a chart showing one example of a voltage applied by the excitation amplifier 43 (line L1) and a current flowing through an electromagnetic coil (line L2)

FIG. 5 is a chart showing one example of the voltage applied by the excitation amplifier 43 to the electromagnetic coil (line L1) and the current flowing through electromagnetic coil (line L2). When the two switching elements SW10 and SW11 are turned ON, voltages are applied to the electromagnetic coils and the currents increase. Further, when the switching elements SW10 and SW11 are turned OFF, inverse voltages are applied to the electromagnetic coils due to the conduction between the diodes D10 and D11 and the currents decrease. Accordingly, the current line L2 shows both of increase and decrease of the current in a single PWM carrier cycle, and sinusoidal variation in a longer cycle. The sinusoidal variation corresponds to the change in the sensor carrier components.

Figure 6:
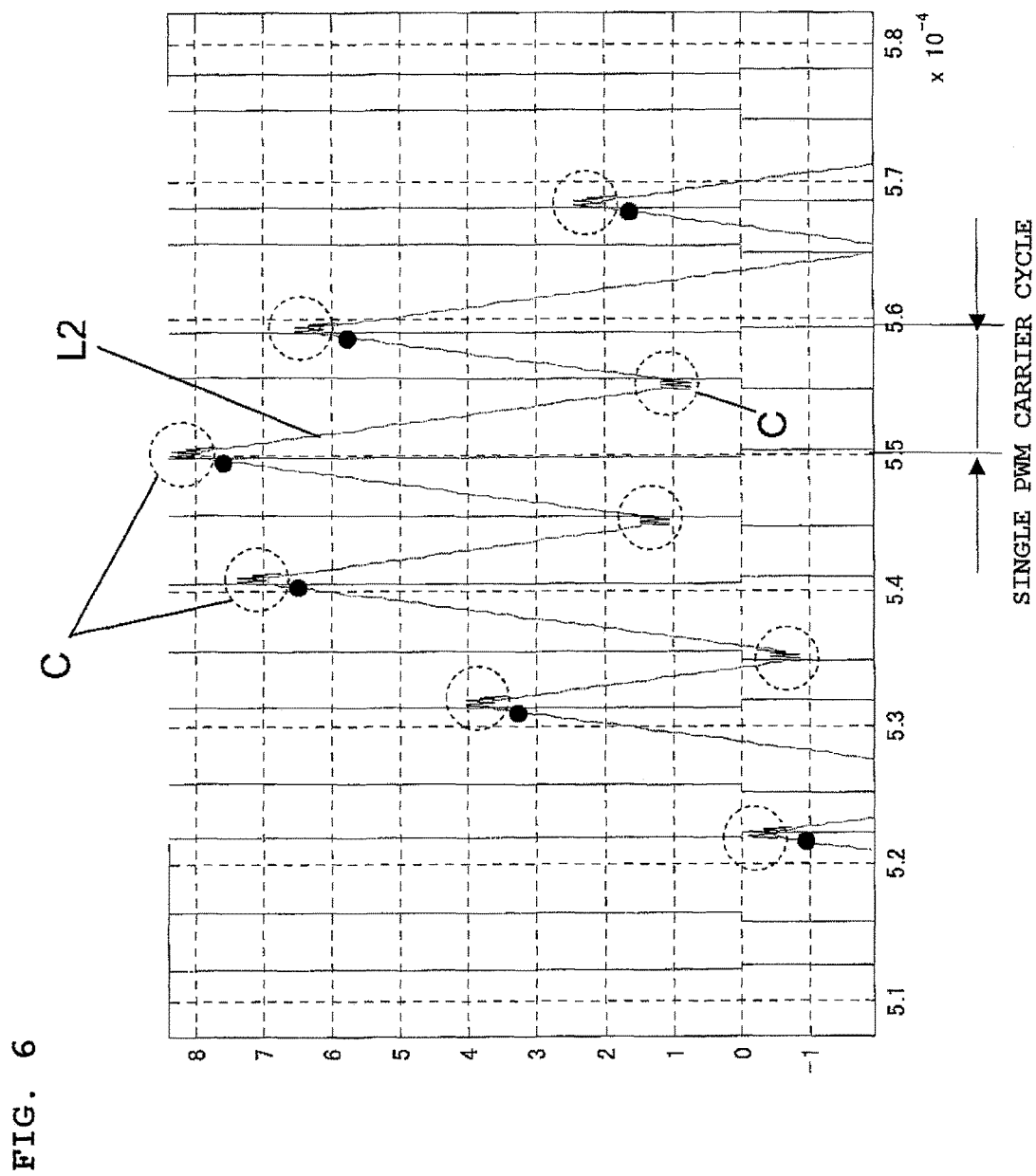
FIG. 6 is an enlarged view of a part indicated by a reference character B in FIG. 5.

FIG. 6 is an enlarged view of a part indicated by a reference character B in FIG. 5. This shows spike-like noises C produced due to a surge voltage or the like when the switching elements SW10 and SW11 are switched from an ON state (ascending line) to an OFF state (descending line) and from the OFF state (descending line) to the ON state (ascending line). In the conventional magnetic bearing device, an influence of this noise component results in degradation of the S/N ratio in the displacement detection. Therefore, in this embodiment, the control as described below is performed in order to reduce the influence of the noise component in the magnetic bearing control.

Figure 7:
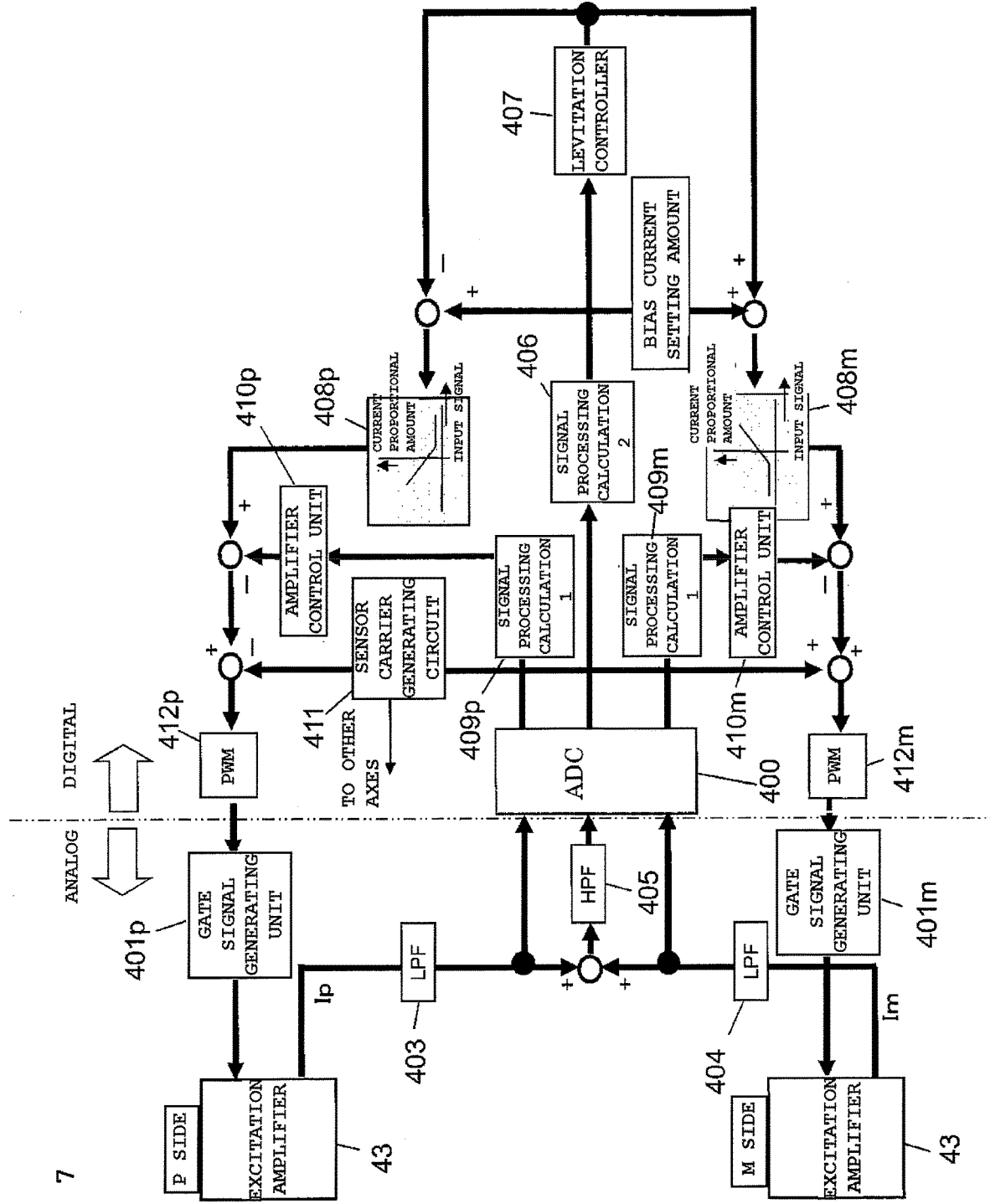
FIG. 7 is a functional block diagram illustrating magnetic bearing control by a controller 44 for a single axis.

FIG. 7 is a functional block diagram illustrating the magnetic bearing control by the controller 44 for the single axis of the five control axes. In the following description, an outline of the control as a whole is firstly described, and then a constitution for reducing the influence of the noise will be described.

As described above, a pair of the magnetic bearing electromagnets 45 (on the P side and the M side) are provided for a single control axis, and the excitation amplifiers 43 are respectively provided for the magnetic bearing electromagnets 45. Each of the ten excitation amplifiers 43 outputs a current detection signal. In the following description, one magnetic bearing electromagnet 45 is assumed to be a single axis, and the control for the ten magnetic bearing electromagnets 45 is assumed to be control for ten axes.

A gate signal generating unit 401p of the controller 44 generates a gate signal for driving the switching element of the excitation amplifier 43 on the P side. Similarly, a gate signal generating unit 401m generates a gate signal for driving the switching element of the excitation amplifier 43 on the M side. When the switching elements of the excitation amplifiers 43 are controlled ON/OFF based on the gate signals, the voltages are applied to the electromagnetic coils of the magnetic bearing electromagnets 45, and the currents Ip and Im flow. From the current sensors 101A and 101B of the excitation amplifier 43 on the P side, a current detection signal of the current Ip flowing through the magnetic bearing electromagnet 45 on the P side (indicated by Ip similarly to the current) is output. On the other hand, from the current sensors 101A and 101B of the excitation amplifier 43 on the M side, a current detection signal of the current Im flowing through the magnetic bearing electromagnet 45 on the M side (indicated by Im similarly to the current) is output.

The current detection signals Ip and Im output from the current sensors 101A and 101B are input to the AD converter 400 via the low-pass filters 403 and 404, respectively. Further, to the AD converter 400, a sum signal (Ip+Im) of the current detection signals Ip and Im that have passed the low-pass filters 403 and 404 is input via a high-pass filter 405. As the current detection signals Ip and Im may be expressed as in the expression (6), the sum signal (Ip+Im) is expressed as in an expression (7) listed below. These signals correspond to the electromagnetic current signal 444 in FIG. 2. The AD converter 400 samples the current detection signals Ip and Im and the sum signal (Ip+Im) at a sampling frequency fs.

$$Ip+Im=2\times ib+2\times B\times d\times \sin(\omega c\times t-\pi/2) \quad (7)$$

Although the details of the low-pass filters 403 and 404 and the high-pass filter 405 will be described later, as the current detection signals Ip and Im pass the low-pass filters 403 and 404, a high-frequency noise component is removed. In addition, as the sum signal (Ip+Im) passes the high-pass filter 405, a bias component (2×ib) contained in the sum signal (Ip+Im) is removed.

The sum signal (Ip+Im) sampled by the AD converter 400 is input to a signal processing and calculating unit 406. The signal processing and calculating unit 406 calculates displacement information of the shaft 5 based on the sampling data. A magnetic levitation controller 407 generates levitation control current setting by proportional control, integral control, derivative control, or the like, based on the displacement information from the signal processing and calculating unit 406. For the control on the P side, a value obtained by subtracting levitation control current setting from a bias current setting amount, and for the control on the M side, a value obtained by adding the levitation control current setting to the bias current setting amount.

Further, there are provided current limit circuits 408p and 408m in order to prevent a case in which when an excessive disturbance or the like is applied to the pump and the shaft 5 is displaced to a large extent, an excitation current of one of the opposing magnetic bearing electromagnets 45 (e.g., on the P side) increases, an excitation current of the other (on the M side, in this case) becomes zero, and a sensor carrier component voltage from being applied only to one side. By providing the current limit circuits 408p and 408m, a sensor carrier voltage is always applied to the magnetic bearing electromagnets 45.

On the other hand, the current detection signals Ip and Im sampled by the AD converter 400 are input to corresponding signal processing and calculating units 409p and 409m respectively. The signal processing and calculating units 409p and 409m calculate information relating to current components that contribute to the levitation controlling force (the bias current ib and the levitation control current ic) based on the sampling data.

The calculation result of the signal processing and calculating unit 409p is subtracted from an output from the current limit circuit 408p after passing through an amplifier control unit 410p. Further, a sensor carrier component (v×sin(ωc×t)) from a sensor carrier generating circuit 411 is subtracted from the subtraction result, and based on the subtraction result, the PWM control signal is generated by a PWM calculating unit 412p. The gate signal generating unit 401p generates a gate drive voltage (gate signal) based on the PWM control signal generated by the PWM calculating unit 412p.

Further, the calculation result of the signal processing and calculating unit 409m is subtracted from an output from the current limit circuit 408m after passing through an amplifier control unit 410m. Moreover, a sensor carrier component (v×sin(ωc×t)) from a sensor carrier generating circuit 411 is added to the subtraction result, and based on the addition result, the PWM control signal is generated by a PWM calculating unit 412m. The gate signal generating unit 401m generates a gate drive voltage based on the PWM control signal generated by the PWM calculating unit 412m.

Next, the constitution for reducing the influence of the spike noise will be described. Firstly, in this embodiment, in order to reduce the influence of the spike noise component, a predetermined minimum on-duty period (or minimum off-duty period) is secured even when the PWM duty changes because the levitation position of the shaft 5 changes due to disturbance and the like. By securing such a minimum on-duty period (or minimum off-duty period), it is possible to provide a sampling enabling period in which the noise component has sufficiently attenuated in every single PWM carrier cycle. Then, in the sampling enabling period, the current detection signals Ip and Im and the sum signal (Ip+Im) may be sampled by the AD converter 400.

Secondly, the sampling enabling period comes at the same timing for all of the ten axes (all of the current detection signals from the ten excitation amplifiers 43). Specifically, a PWM carrier frequency fpwm, a sensor carrier frequency fc to be lapped over the voltage, and the sampling frequency fs when sampling a signal by the AD converter 400 are synchronized so as to have a relation of integral multiple (fpwm=n×fc, fs=k×fc). Then, the AD converter 400 samples for all of the ten axes at the same time.

Thirdly, filters related to the current detection signals Ip and Im sampled by the AD converter 400 and the sum signal (Ip+Im) are configured so that the signal delay may not have any influence to the timing of the bulk sampling by the AD converter 400.

(First Constitution)

Firstly, a first constitution will be described. In the excitation amplifier 43 that controls the current by PWM-controlling the switching elements SW10 and SW11, the current is controlled to increase or decrease by changing on-duty of the PWM control signal in a single PWM carrier cycle illustrated in FIG. 5. Accordingly, for example, when performing sampling in a period during which the switching elements SW10 and SW11 are turned ON (referred to as an on-duty period), if the on-duty period is very short, the spike noise produced when switching is not attenuated sufficiently during this period, and a signal influenced by the spike noise is sampled by the AD converter 400. This applies to a case in which a signal is sampled in an off-duty period, and if the off-duty period is very short, the sampled signal includes an influence of the spike noise.

Figure 8B:
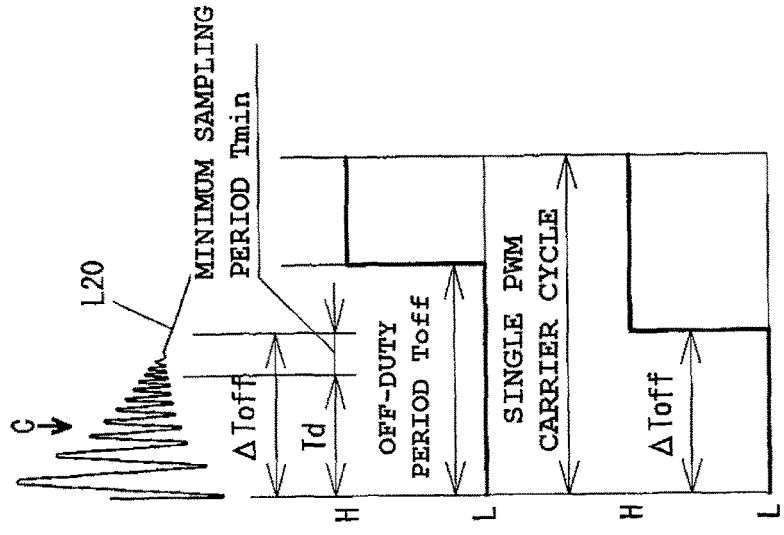
FIGS. 8A and 8B illustrate a relation among a spike noise C included in current detection signals Ip and Im, agate signal, and detection timing.
Figure 8A:
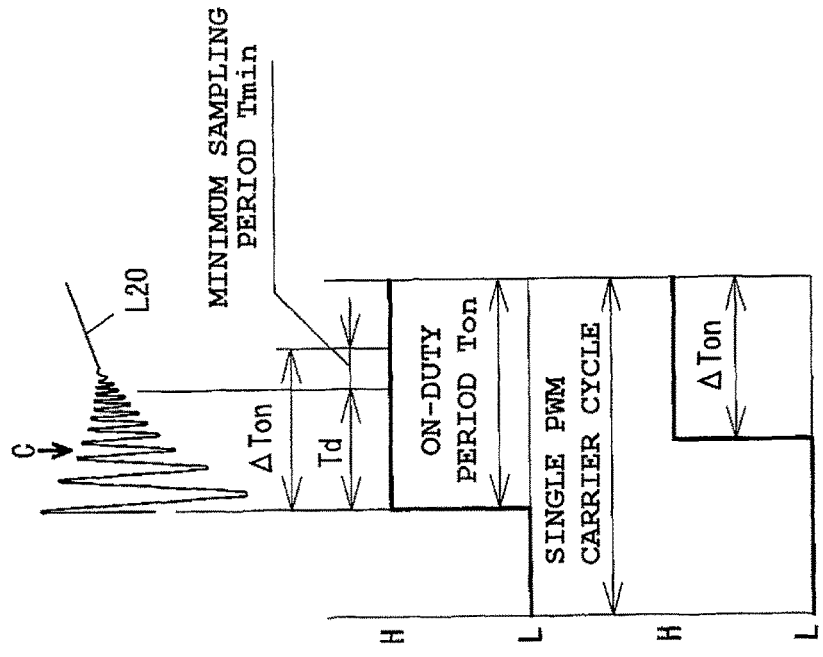

Accordingly, in this embodiment, a minimum on-duty period ΔTon as shown in FIG. 8A is set for duration time of on-duty. On the other hand, when sampling a signal in the off-duty period, a minimum off-duty period ΔToff as shown in FIG. 8B is set.

FIGS. 8A and 8B illustrate a relation among a spike noise C included in the current detection signals Ip and Im, a gate signal, and detection timing. A line L20 indicates the current detection signal, and a part indicated by a reference character C is the spike noise. FIG. 8A shows a case in which the current detection signal is sampled by the AD converter 400 during the on-duty period, and FIG. 8B shows a case in which the current detection signal is sampled by the AD converter 400 during the off-duty period. In either case, two types of the gate signal are shown under the line L20.

In the case of FIG. 8A, the minimum on-duty period ΔTon is obtained by adding the minimum sampling period Tmin for sampling by the AD converter 400 to attenuation time Td of the spike noise C (ΔTon=Td+Tmin). The attenuation time Td indicates time duration from the production of the spike noise until a time point at which the noise component attenuates and its influence has no problem. By sampling the signal during the minimum sampling period Tmin that is after the attenuation time Td has passed from rising of an application voltage (switching of the gate signal to the high level) it is possible to sample a signal hardly having any influence of the spike noise. In this embodiment, when performing the PWM control, the gate signal is generated so that the on-duty period becomes greater than the minimum on-duty period ΔTon The duration time of on-duty (on-duty period) Ton is controlled within a range of ΔTon≤Ton≤Tpwm (single PWM carrier cycle). The gate signal on the upper side of FIG. 8A shows a case in which the on-duty period Ton is longer than the minimum on-duty period ΔTon. By contrast, the gate signal on the lower side shows a case in which the on-duty period Ton is controlled to be minimized and Ton=ΔTon.

On the other hand, the minimum off-duty period ΔToff in the case of FIG. 8B is also set such that ΔToff=Td+Tmin, similarly to the minimum on-duty period ΔTon. The sampling of the current detection signal by the AD converter 400 may be performed at any timing within the minimum sampling period Tmin. The attenuation time Td in the minimum on-duty period ΔTon and the minimum off-duty period ΔToff is determined, for example, based on an actual measurement result by actually measuring the attenuation time of the spike noise C. Further, as ΔToff is preferably as small as possible in terms of the controllability of the PWM control, it is desirable that the minimum sampling period Tmin be as small as possible in a range where sampling can be performed by the AD converter 400.

In this embodiment, as the on-duty in the PWM control is controlled to be equal to or greater than the minimum on-duty period ΔTon, it is possible to ensure the minimum sampling period Tmin during which the signal may be sampled without being influenced by the spike noise. Further, similarly in the constitution in which the signal is sampled during the off-duty period, by setting the minimum off-duty period ΔToff to off-duty, it is possible to ensure the minimum sampling period Tmin during which the signal may be sampled without being influenced by the spike noise.

Of course, when Ton>ΔTon as the gate signal on the upper side of FIG. 8A, the signal may be sampled after the minimum sampling period, that is after the minimum sampling period Tmin until the gate signal is switched to the L level. The same applies to the case shown in FIG. 8B.

(Second Constitution)

Figure 9:
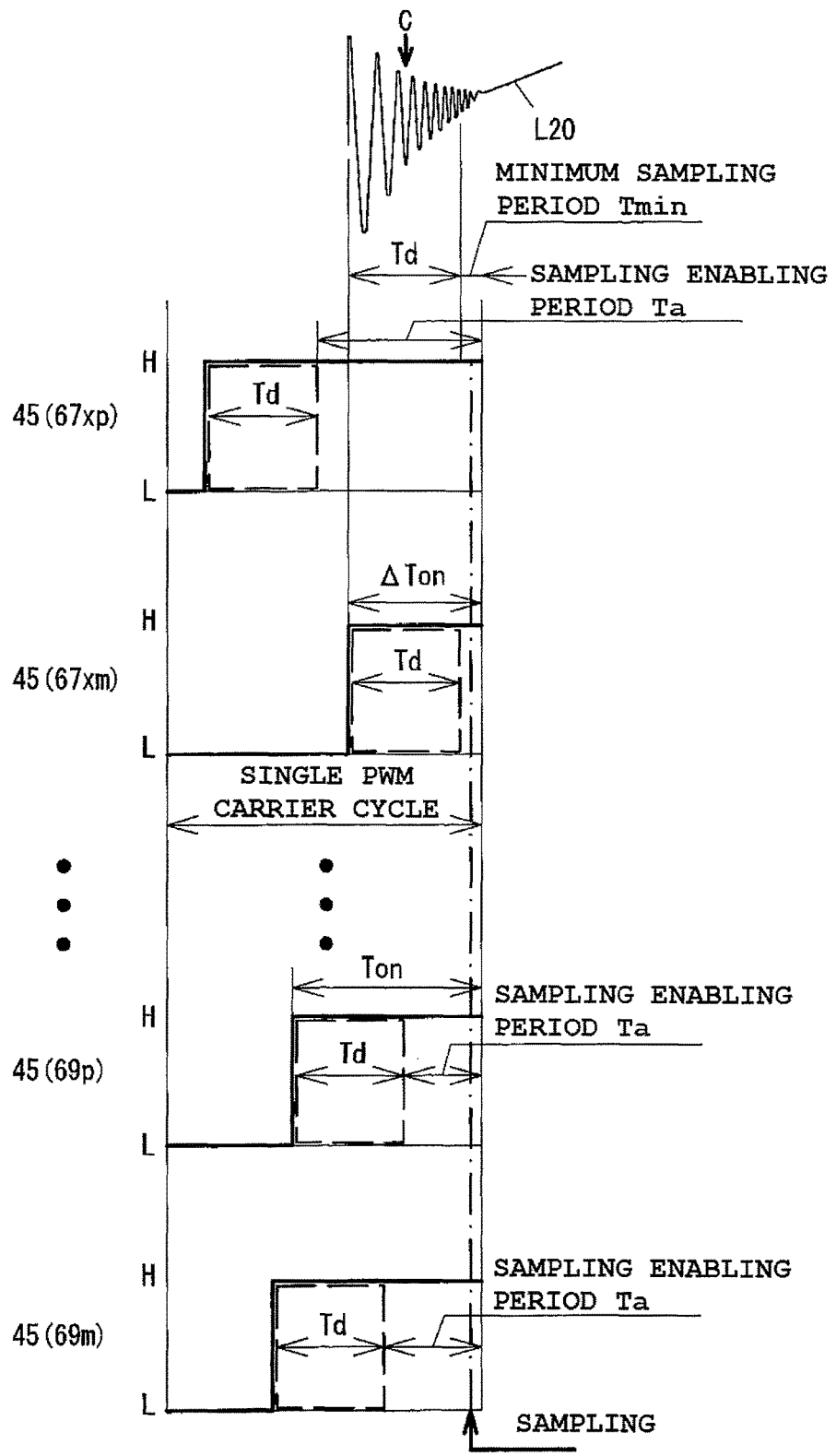
FIG. 9 is a diagram schematically illustrating a gate signal and timing for bulk sampling for each axis.

Next, a second constitution will be described. The fact that the timing of the sampling enabling periods for all of the ten axes becomes the same meaning that single PWM carrier cycles of the gate signals of the excitation amplifiers 43 coincide, as illustrated in FIG. 9. In order to make the single PWM carrier cycles of the signals coincide as illustrated in FIG. 9, in this embodiment, the PWM carrier frequencies fpwm for all of the ten axes are the same and synchronized.

FIG. 9 is a diagram schematically illustrating a gate signal and timing for bulk sampling for each axis. FIG. 9 shows only the gate signals relating to, among ten axes (ten gate signals), the pair of magnetic bearing electromagnets 45(67xp) and 45(67xm) disposed in a direction of the x axis of the magnetic bearing 67 and the pair of magnetic bearing electromagnets 45(69p) and 45(69m) disposed in a direction of the y axis of the magnetic bearing 69.

To each of the excitation amplifiers 43, the gate signal as illustrated in FIG. 9 is input, and a similar rectangular voltage is applied to each of the magnetic bearing electromagnets 45. As a result, the spike noise C including frequency components in a wide range is produced at the rising of each application voltage. Each of period of the gate signals indicated by dashed lines represents an attenuation period of the spike noise C, and the spike noise C indicated by the line L20 at the top of the figure represents the spike noise produced in the current of the magnetic bearing electromagnet 45(67xm).

The example shown in FIG. 9 is a case in which the on-duty period of the gate signal for the magnetic bearing electromagnet 45(67xm) is shortest among the ten axes. As the on-duty period Ton is set to be equal to or greater than the minimum on-duty period ΔTon, during a sampling enabling period Ta after the attenuation time Td has passed until a right end of the on-duty period Ton, the signals for the ten axes (signals output from the ten excitation amplifiers 43) are sampled at once.

As Ton=ΔTon, Ta=Tmin in the case of the gate signal of the magnetic bearing electromagnet 45(67xm). Further, in a case in which the gate signal of the magnetic bearing electromagnet 45(69p) is as illustrated in FIG. 9 in the on-duty period, the sampling enabling period Ta becomes Ta>Tmin. As described above, in this embodiment, a signal is sampled after a time period longer than the attenuation time Td has passed after the spike noise C is produced, and therefore, any of the sampled signals are hardly influenced by the noise.

Figure 10:
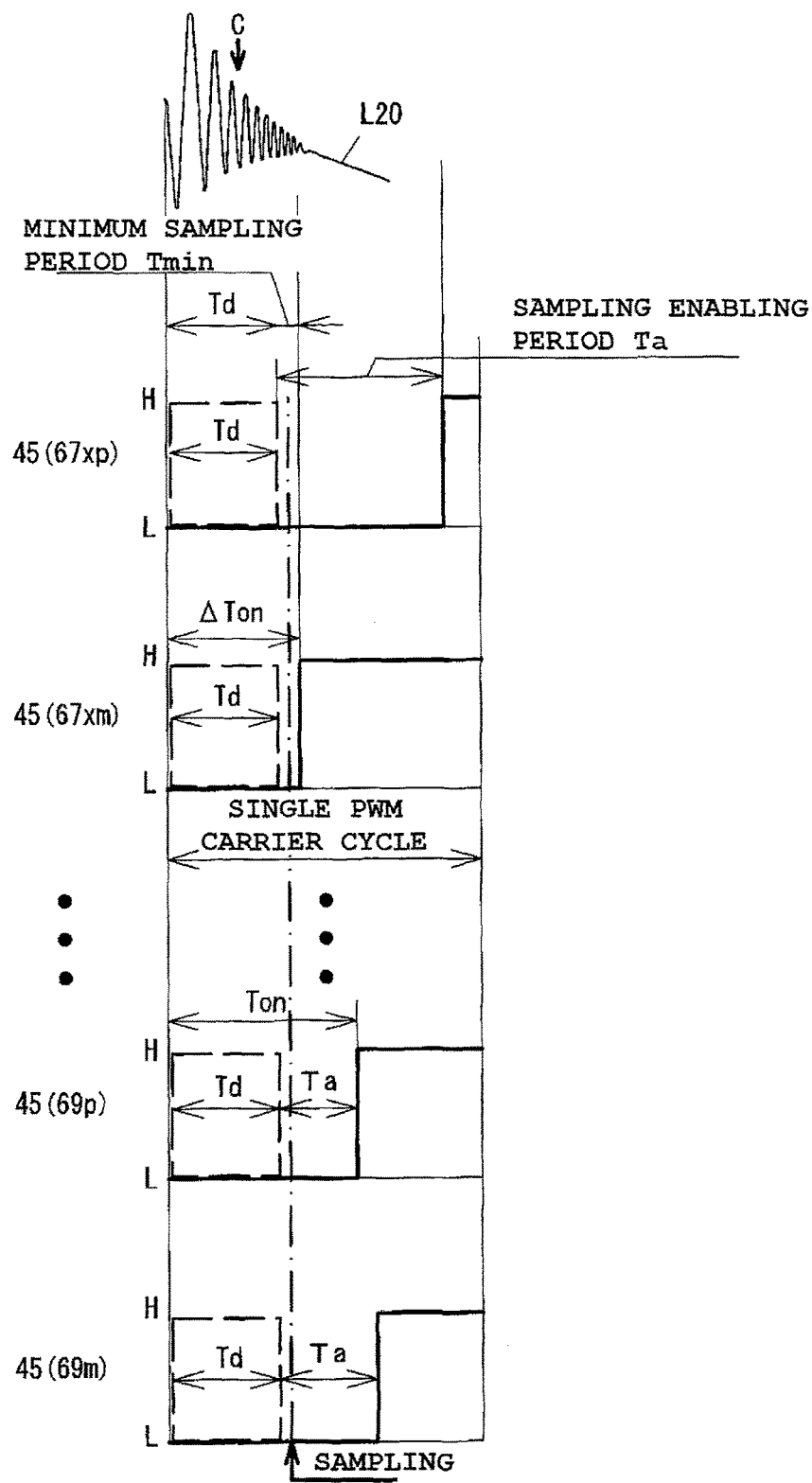
FIG. 10 is a diagram schematically illustrating a gate signal for each axis and timing for bulk sampling when sampling of a signal is performed in an off-duty period Toff.

FIG. 10 is a diagram corresponding to FIG. 9 when sampling of a signal is performed in an off-duty period Toff. Also in this case, the sampling timing is determined based on the gate signal of the magnetic bearing electromagnet 45(67xm) having the shortest off-duty period Toff. Specifically, regarding the gate signal of the magnetic bearing electromagnet 45(67xm), all of the signals for the ten axes between a time point at which the attenuation time Td has passed since start timing of the off-duty period Toff and a time point at which the off-duty period Toff ends are sampled at once.

For example, when the PWM carrier frequency is 80 kHz, a single PWM carrier cycle is 12.5 μs. Since it takes about 0.5 μs to 1 μs for the switching noise to be attenuated, the attenuation time corresponds to 4% to 8% of 12.5 μs. Thus, it is appropriate to secure 5% to 20% of 12.5 μs, which is longer than the attenuation time, as the minimum on-duty period ΔTon (or the minimum off-duty period ΔToff). Therefore, the minimum sampling period Tmin becomes on the order of 0.1 μs to 1 μs. By sampling the signal during this period, it is possible to sample the signal without being influenced by the noise.

Further, when performing bulk sampling for all of the ten axes as illustrated in FIGS. 9 and 10, in order to sample signals best suited for the current detection signals Ip and Im and the sum signal (Ip+Im), the PWM carrier frequency fpwm, the sensor carrier frequency fc to be lapped over the voltage, and the sampling frequency fs when sampling the current detection signals Ip and Im and the sum signal (Ip+Im) by the AD converter 400 are synchronized so as to have a relation of integral multiple (fpwm=n×fc, fs=k×fc).

Figure 11:
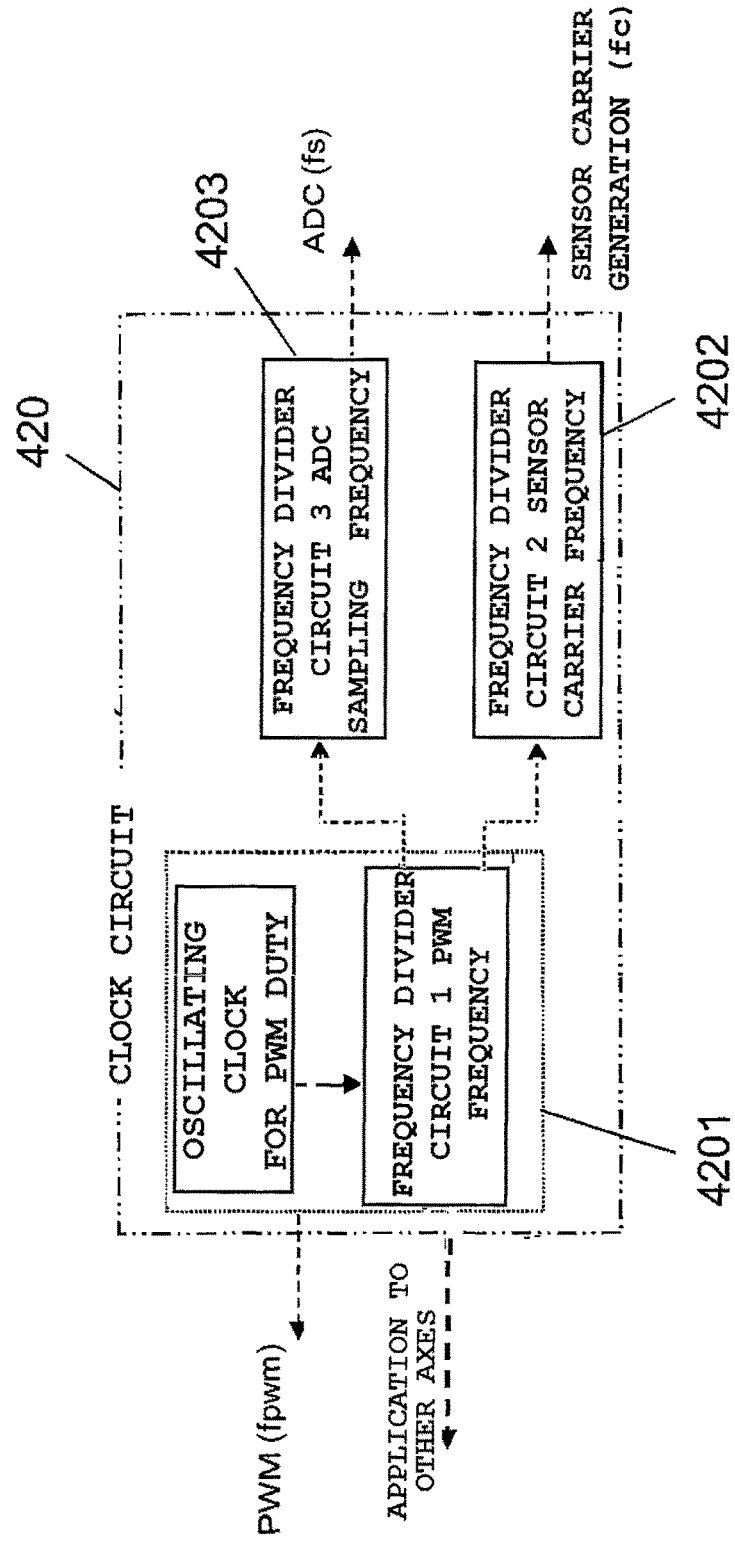
FIG. 11 is a block diagram illustrating a constitution of a clock circuit 420 as a synchronizing unit for the controller 44.

FIG. 11 is a block diagram illustrating a constitution of a clock circuit 420 as a synchronizing unit for the controller 44. A frequency divider circuit 4201 divides a signal from an oscillating clock for PWM duty to generate a pulse signal for PWM carrier (fpwm). A frequency divider circuit 4202 divides a signal from the frequency divider circuit 4201 to generate a pulse signal for sensor carrier (fc). A frequency divider circuit 4203 divides a signal from the frequency divider circuit 4201 to generate a pulse signal for AD conversion (fs). These signals are applied to each axis.

Figure 12:
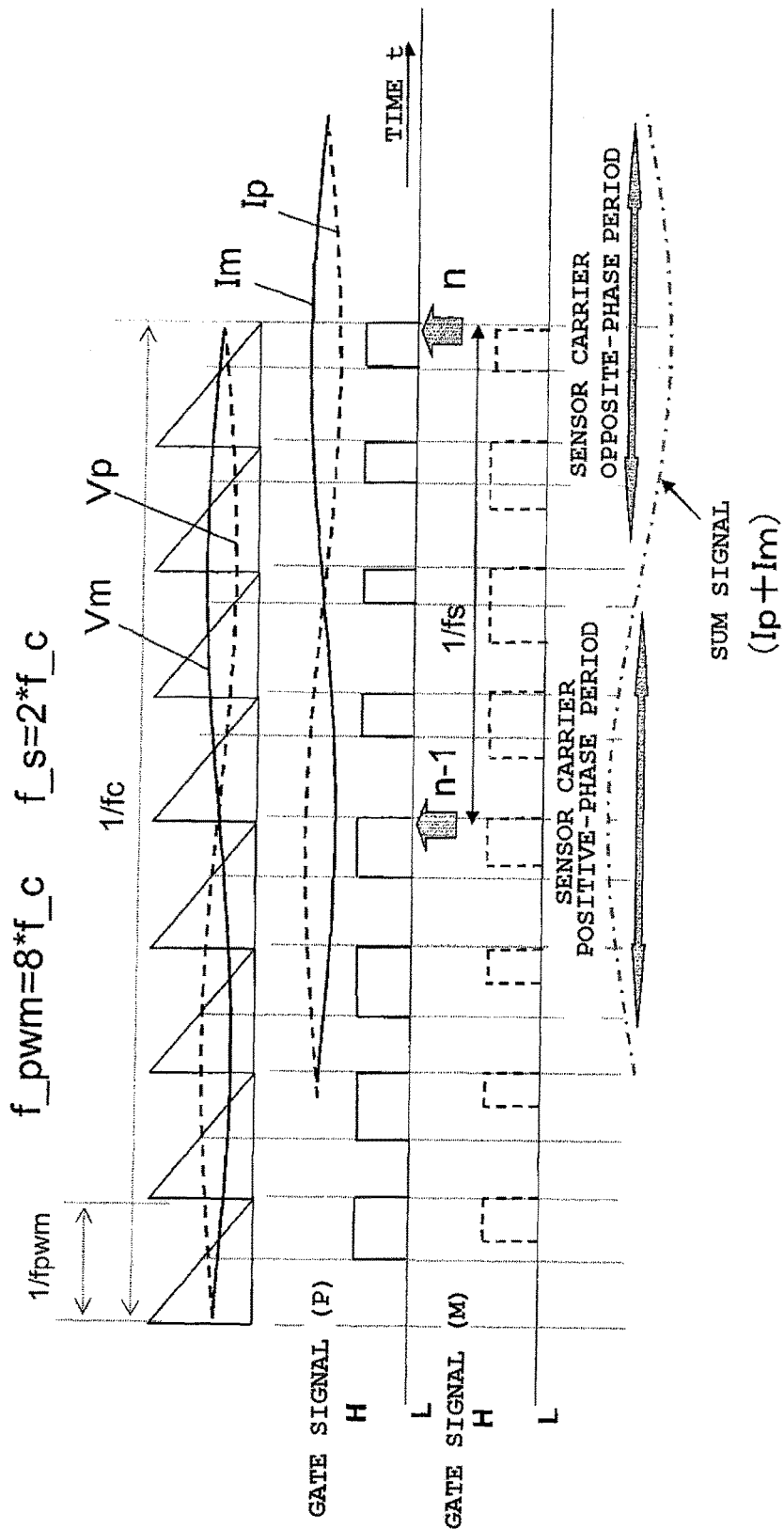
FIG. 12 is a diagram for illustration of voltages Vp and Vm, currents Ip and Im, and timing for sampling signals.

FIG. 12 is a diagram for illustration of the voltages Vp and Vm applied to the coils of the magnetic bearing electromagnets 45, the currents Ip and Im flowing through the coils, and the timing for sampling the signals. In FIG. 12, a relation among the PWM carrier frequency fpwm, the sensor carrier frequency fc, the sampling frequency fs by the AD converter 400, the gate signals specific to the sensor carrier components, a coil application voltage, a coil excitation current, the sum signal (i.e., displacement signal) is shown for a single control axis (on the P side and the M side). Specifically, the sensor carrier components for the voltages Vp and Vm and the currents Ip and Im are shown.

The values for fpwm, fs, and fc are set so as to be fpwm>fs>fc. In the example shown in FIG. 12, fpwm=8×fc, and fs=2×fc. The relation is fpwm>fs>fc. A relation among cycles Tpwm, Ts, Tc is 8Tpwm=2Ts=Tc, and the sampling is performed once in four PWM carrier cycles, and twice in a single cycle of carrier signal. When fpwm is 80 kHz (Tpwm=12.5 μs), fc is 10 kHz (Tc=100 μs), and fs is 20 kHz (Ts=50 μs).

As illustrated in FIG. 12, all of amplitude phases of the sensor carrier components for the voltages and the currents coincide. For the sensor carrier components, a resistance component may be ignored as in the expression (4), the phase of the current delays from the voltage by 90 deg.

$$vsp = Lp \times d(isp)/dt$$

$$vsm = Lm \times d(ism)/dt \quad (4)$$

Considering the delay, in the sampling enabling period closest to timing at which the current amplitudes on the P side and the M side are maximized, the current detection signals Ip and Im for all of the axes and the sum signals (Ip+Im) for these are sampled by the AD converter 400 at once. In the example shown in FIG. 12, thick arrows indicate the sampling timing. Assuming that the current sampling timing in a single sampling cycle (1/fs) is n, a previous sampling timing by one is n−1. The sampling timing n−1 (the left arrow) is in the sampling enabling period that is in a positive phase region of the sensor carrier and immediately before the fourth PWM cycle moves to the next cycle. Further, the current sampling timing n is in the sampling enabling period that is in an opposite phase region of the sensor carrier and immediately before the eighth PWM cycle moves to the next cycle. Since three signals (Ip, Im, and Ip+Im) are sampled for a single control axis, in the 5-axis control, the number of the signals sampled is 5×3=15.

In the signal processing and calculating units 406, 409p, and 409m illustrated in FIG. 7, the following calculation is performed based on data for the current sampling cycle n and data for the previous sampling cycle n−1.

Firstly, the signal processing and calculating units 409p and 409m perform moving average processing to the current detection signals Ip and Im at the sampling cycle (1/fs). As illustrated in FIG. 12, for the sampling cycle (1/fs), amplitude of the sensor carrier components of current detection signals Ipn and Imn sampled in the current cycle n and current detection signals Ipn−1 and Imn−1 sampled in the previous cycle n−1 is almost maximum amplitude, but in an opposite-phase relation.

On the other hand, frequency bandwidths of the bias component, the levitation control component, and the displacement variation component are roughly equal to or smaller than 1 kHz. In this manner, the frequency bandwidths of the bias component, the levitation control component, and the displacement variation component change slowly on the order of 1/10 of the change of the sensor carrier component, and therefore do not change and are substantially constant within the single sampling cycle (1/fs). Accordingly, by performing moving average processing as expressed by an expression (8) listed below, it is possible to extract only the current components (the bias current ib and the levitation control current ic) excluding the sensor carrier component and contributing to the levitation controlling force.

The current on the $P$ side = $(Ipn+Ipn-1)/2$

The current on the $M$ side = $(Imn+Imn-1)/2$ \quad (8)

It should be noted that if a digital low-pass filter is configured as a part of the amplifier control units 410p and 410m (see FIG. 7) for feedback control, when fs=2×fc, it is possible to obtain a low-pass filter that has a steep attenuation characteristic to fc whose frequency is as half as that of fs. Accordingly, it is possible to remove the sensor carrier component that is fed back, and to improve the constant property of the voltage for the sensor carrier component.

The signal processing and calculating unit 406 performs the following calculation. As the sum signal (Ip+Im) passes through the high-pass filter 405 in FIG. 7, a signal in which the bias component is cancelled is obtained. This signal is a displacement signal that has been modulated by displacement.

Similarly to the current detection signals, the sum signal (Ip+Im) indicated by an alternate long and short dash line in FIG. 12 is such that amplitude of a sum signal (n) sampled in the current cycle n and a sum signal (n−1) sampled in the previous cycle n−1 within the sampling cycle (1/fs) is almost maximum amplitude, but in an opposite-phase relation. However, the sensor carrier components are cancelled in the case of the current detection signals indicated by a solid line (Im) and a dashed line (Ip), but it is necessary to extract displacement having a sign from the sensor carrier components in the case of the displacement signals.

In FIG. 12, since the current cycle n is in a sensor carrier opposite phase period, and the sign of the amplitude of the sum signal is opposite of that of the displacement d, sign inversion is required when averaging. Therefore, in the process of generating a voltage control output in PWM, it is determined that the phase is positive when the phase θ of the voltage Vp is near θ=π, and opposite when the phase is near θ=2π (or 0). Specifically, displacement n is calculated as in an expression (9) listed below, using the sum signal (n) sampled in the current cycle n and the sum signal (n−1) sampled in the previous cycle n−1. However, when n is the sensor carrier opposite phase period, reversal processing to reverse the sum signal (n) to −sum signal (n) is performed before the calculation of the expression (9).

displacement $(n)$=(sum signal $(n)$+sum signal $(n-1))/2$   (9)

In a case in which it is necessary to perform gain and offset adjustment in order to correct variation in characteristics of the electromagnetic coils on the P side and the M side, an error of the predetermined levitation position, and the like, correction processing similarly to the case of conventional correction of sensor signals is performed.

(Third Constitution)

Figure 13:
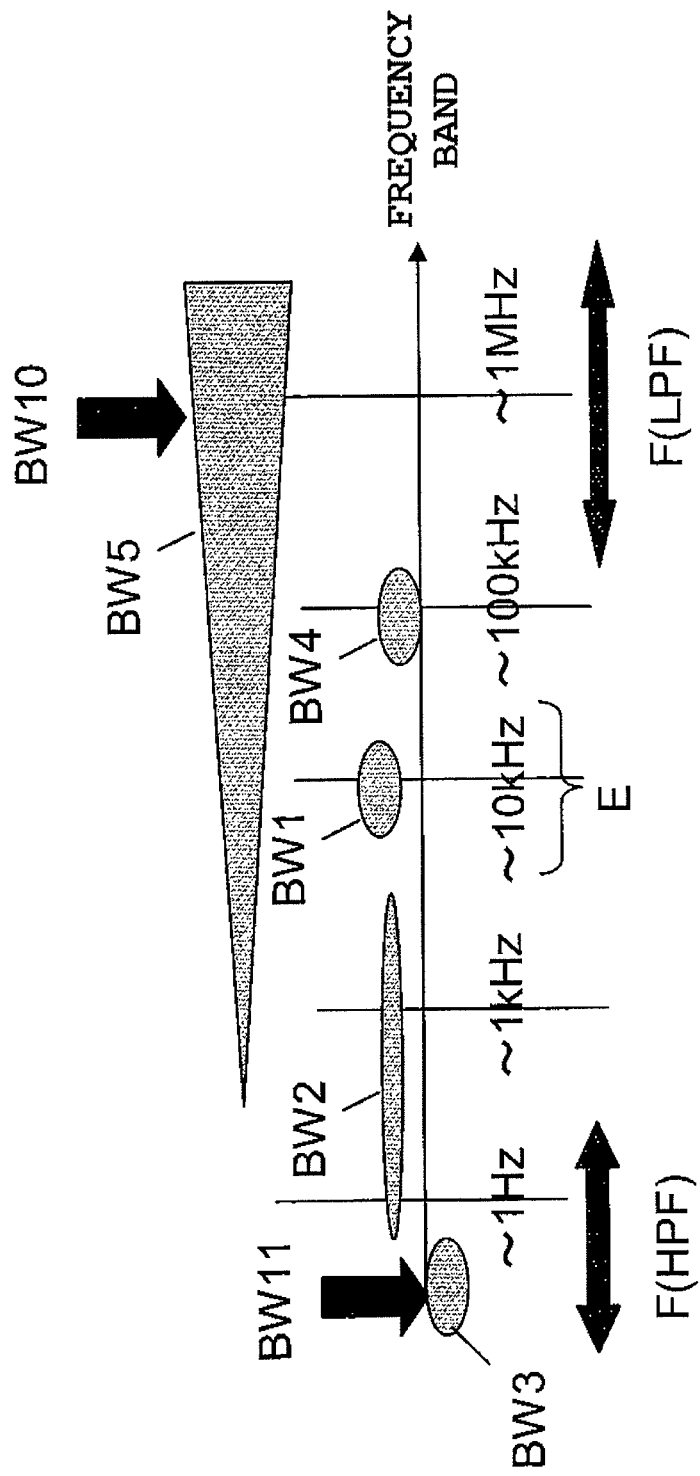
FIG. 13 is a diagram for illustration of an influence of a filter.

Next, a third constitution will be described. FIG. 13 is a diagram for illustration of an influence of a filter. In FIG. 13, bandwidths indicated by BW2, BW3, BW4, and BW5 respectively represent the bandwidth of the levitation control component, the bandwidth of the bias component, the bandwidth of the PWM carrier component, and the bandwidth of the noise component. Further, a bandwidth indicated by a reference character E represents a displacement signal modulation bandwidth.

As illustrated in FIG. 7, the low-pass filters 403 and 404 are provided for filtering of the current detection signals Ip and Im. In this embodiment, in order to cut the switching noise, a low-pass filter that cuts only a frequency higher than the PWM carrier frequency (BW10) is applied as the low-pass filters 403 and 404 as illustrated in FIG. 13.

Further, the high-pass filter 405 is provided for filtering of the sum signal (Ip+Im) as a displacement signal. The sum signal (Ip+Im) is expressed by the expression (7) listed above. It is possible to remove the bias component ib by applying the high-pass filter 405 to the sum signal (Ip+Im) to cut a low frequency band (BW11).

$Ip+Im=2\times ib+2\times B\times d\times\sin(\omega_c xt-\pi/2)$   (7)

Figure 14:
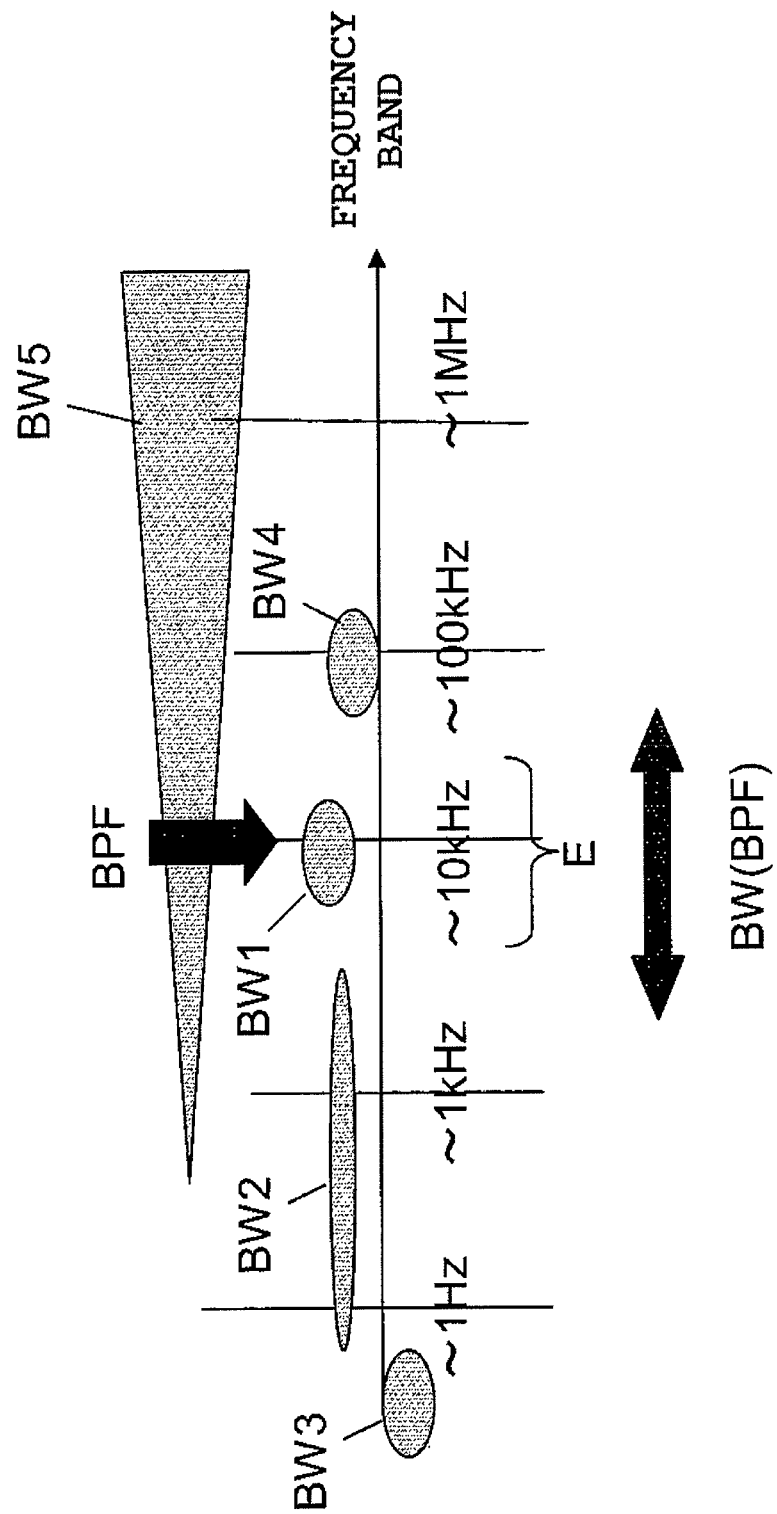
FIG. 14 is a diagram for illustration of a constitution of a conventional filter using a bandpass filter.

Conventionally, as illustrated in FIG. 14, a bandpass filter centering the sensor carrier frequency is generally employed. However, as a bandpass filter BPF is used for the sensor carrier frequency bandwidth BW1 that is amplitude-modulated in the gap displacement, the sensor signal after the detection delays to some extent depending on the steepness of a gain characteristic of the bandpass filter. In FIG. 14, BW (BPF) indicates a bandwidth that delays by being influenced by the bandpass filter BPF.

On the other hand, in this embodiment, only the low-pass filters 403 and 404 for a higher frequency and the high-pass filter 405 for a lower frequency both far from the sensor carrier frequency bandwidth are used. Specifically, a filter having the bandwidth that is several times higher than the PWM carrier frequency is provided, and a low-pass filter having the bandwidth that is lower than the PWM carrier frequency is not used at least. The bandwidths of low-pass filters 403 and 404 are intentionally increased in order to ensure the state in which attenuation occurs quickly in minimum ensured duty and no spike noise is produced. As the high-pass filter 405, a high-pass filter having a bandwidth lower than the sensor carrier frequency by double digits or more. As illustrated in FIG. 13, a bandwidth influenced by the high-pass filter 405 is low as indicated by an arrow F (HPF), a bandwidth influenced by the low-pass filters 403 and 404 is high as indicated by an arrow F (LPF).

As a result, it is possible to ignore the influence of the delay for the displacement signal modulation bandwidth E. With this, it is possible to increase stability against a high order of elastic oscillation, especially in the levitation control.

Figure 15:
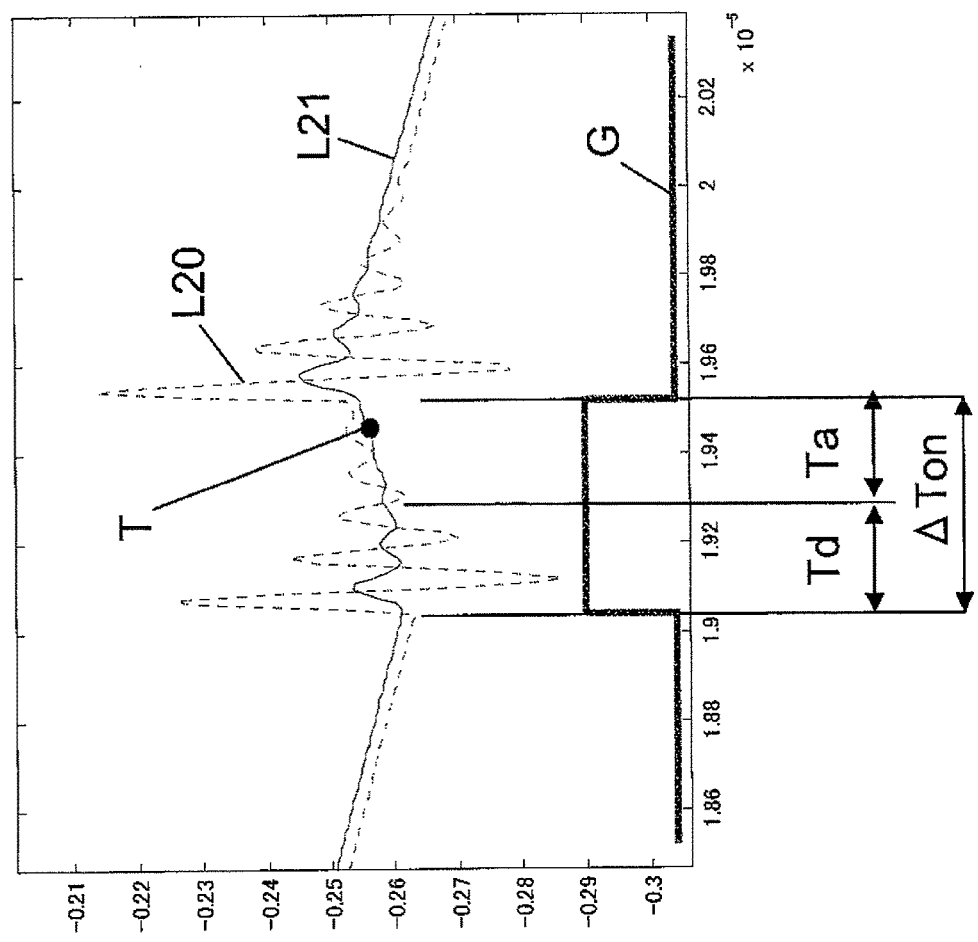
FIG. 15 is a diagram for illustration of an influence of a signal delay to sampling timing in a case in which a bandwidth of a low-pass filter is appropriate.
Figure 16:
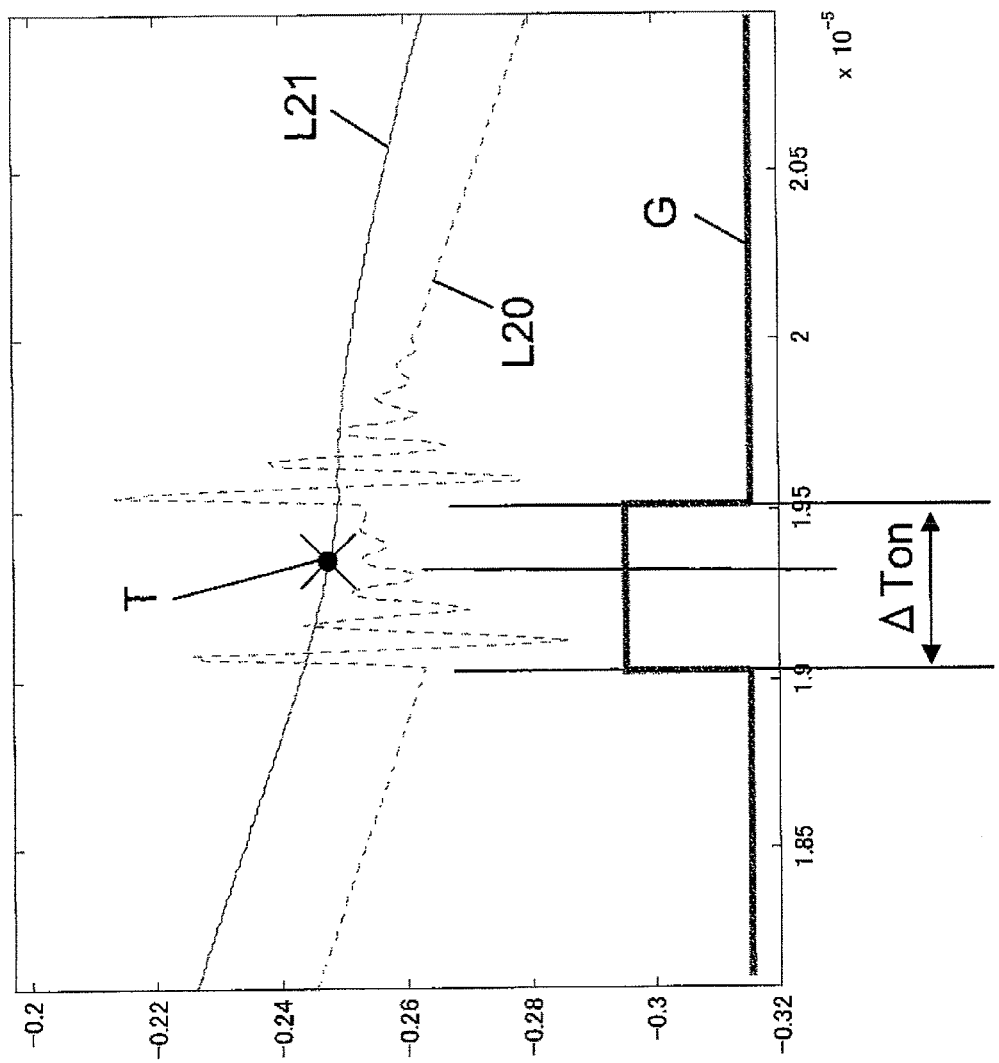
FIG. 16 is a diagram for illustration of an influence of a signal delay to sampling timing in a case in which a bandwidth of a low-pass filter is wider on a low-frequency side and is inappropriate.

Further, by reducing the signal delay, it is possible to prevent the sampling timing from being influenced by the signal delay. FIGS. 15 and 16 are diagrams for illustration of the influence of the signal delay to the sampling timing. FIG. 15 shows a gate signal G, a current detection signal L20 before passing through the low-pass filter, and a current detection signal L21 after passing through the low-pass filter, in a case in which the low-pass filters 403 and 404 according to this embodiment are appropriate. FIG. 16 shows the current detection signals L20 and L21 in a case in which a bandwidth of the low-pass filter is wider on a low-frequency side and is inappropriate.

FIG. 15 shows the case of this embodiment, where corner frequencies of the low-pass filters 403 and 404 are higher than the PWM carrier frequency by one digit. For the sampling enabling period Ta, the influence of the noise is sufficiently attenuated, and a signal having substantially no noise influence may be sampled at sampling timing T.

By contrast, FIG. 16 shows the case in which the bandwidth of the low-pass filter is wider on the low-frequency side and is inappropriate (the corner frequency is as low as the PWM carrier frequency). It can be seen that due to an influence of the low-pass filter, the waveform of the line L21 near the sampling timing T is different from that shown in FIG. 15, and it is not possible to sample an appropriate signal.

As described above, this embodiment includes: the pair of magnetic bearing electromagnets 45 provided for each of a plurality of control axes so as to face against the shaft 5; the plurality of excitation amplifiers 43 configured to perform PWM control to the voltage applied to the magnetic bearing electromagnets 45 and supply the electromagnetic currents on which the sensor carrier signal for detecting the change of the levitation position of the shaft 5 is overlapped to each of the magnetic bearing electromagnets 45; the plurality of current sensors 101A and 101B configured to detect the electromagnetic currents; and the controller 44 configured to obtain the magnetic levitation information of the shaft 5 by AD sampling of the current detection signals from the plurality of current sensors 101A and 101B and the sum signal obtained by adding the pair of current detection signals relating to the pair of magnetic bearing electromagnets 45, and perform PWM control of the excitation amplifiers 43 based on the magnetic levitation information. The PWM control is performed so that the on-duty period Ton of the PWM carrier signal is equal to or longer than the minimum on-duty period ΔTon, or the length of the off-duty period Toff is equal to or longer than the minimum off-duty period Toff.

As a result, it is possible to ensure at least the minimum on-duty period ΔTon in any of the on-duty periods Ton. Thus, by performing the AD sampling after a predetermined time period (the attenuation time Td) passes from the starting timing of the on-duty period Ton or the off-duty period Toff, it is possible to obtain a sampling signal (magnetic levitation information) hardly having any influence of the spike noise.

Further, by providing the low-pass filters 403 and 404 having the bandwidth higher than the PWM carrier frequency fpwm for filtering the current detection signals Ip and Im, it is possible to reduce the spike noise component, and the influence of the delay to the signal components including the displacement information, and to prevent the signal from delaying when AD sampling.

Moreover, by providing the high-pass filter 405 for removing the direct component from the sum signal (Ip+Im), it is possible to remove the bias component included in the sum signal as the displacement signal, and to obtain more correct displacement information.

Furthermore, by setting the frequency fpwm of the PWM carrier signal, the frequency fc of the sensor carrier signal, and the frequency fs for the AD sampling to be in the relation of integral multiple, and by AD sampling the plurality of current detection signals Ip and Im for each of the plurality of magnetic bearing electromagnets 45 and the sum signal (Ip+Im) at once, it is possible to obtain the signals respectively relating to the plurality of magnetic bearing electromagnets 45 without being influenced by the spike noise.

Moreover, by setting the relation between the PWM carrier frequency fpwm, the AD sampling frequency fs, and the sensor carrier frequency fc such that fpwm>fs>fc, it is possible to realize an inexpensive controller. Practically, it is preferable that fs=2×fc and fpwm=n×fc, where n is on the order of 8, 10, 12, 14, or 16.

It should be noted that the above description shows mere examples, and the present invention is not limited to the above embodiments unless undermining the characteristics of the present invention. For example, while the turbo-molecular pump having the turbo pump stage and the drag pump stage taken as an example in the above embodiments, it is possible to apply the present invention similarly to a turbo-molecular pump all of whose stages are of a turbine blade type, a molecular pump only having drag pump stages, or a vacuum pump in which a rotor is supported by a magnetic bearing.

What is claimed is:

1. A magnetic bearing device comprising:
    a pair of electromagnets provided for each of a plurality of control axes so as to face a rotor shaft;
    a plurality of excitation amplifiers configured to perform PWM control to a voltage applied to each of the electromagnets, and supply an electromagnetic current on which a sensor carrier signal for detecting a change of a levitation position of the rotor shaft is overlapped to each of the electromagnets;
    a plurality of current sensors each configured to detect the electromagnetic current; and
    a controller configured to obtain magnetic levitation information of the rotor shaft by AD sampling of current detection signals from the plurality of current sensors, and perform PWM control of the excitation amplifiers based on the magnetic levitation information, wherein
    a minimum period is set for an on-duty period or an off-duty period of a PWM control signal in a single PWM carrier cycle, the minimum period being longer than a predetermined time period based on an attenuation characteristic of a spike noise produced in the electromagnetic current,
    the controller performs PWM control so that a length of one of the on-duty period and the off-duty period is equal to or greater than the minimum period, and performs the AD sampling after the predetermined time period passes from starting timing of one of the on-duty period and the off-duty period.

2. The magnetic bearing device according to claim 1, further comprising:
    a low-pass filter having a bandwidth higher than a PWM carrier frequency for the current detection signals, wherein
    the controller performs AD sampling to the current detection signals that have passed through the low-pass filter.

3. The magnetic bearing device according to claim 1, wherein
    the controller obtains the magnetic levitation information of the rotor shaft by AD sampling of current detection signals from the plurality of current sensors and a sum signal obtained by adding the pair of current detection signals relating to the pair of electromagnets.

4. The magnetic bearing device according to claim 3, further comprising:
    a high-pass filter for removing a direct component from the sum signal, wherein
    the controller performs AD sampling to the sum signal that has passed through the high-pass filter.

5. The magnetic bearing device according to claim 1, wherein
    a frequency fpwm of the PWM carrier signal, a frequency fc of the sensor carrier signal, and a frequency fs of the AD sampling are set to be in a relation of integral multiple, and
    the controller performs AD sampling to the plurality of current detection signals relating to each of the plurality of electromagnet at once.

6. The magnetic bearing device according to claim 1, wherein
    the PWM carrier frequency fpwm, the AD sampling frequency fs, and the sensor carrier frequency fc are set to be in a relation of fpwm>fs>fc.

7. A vacuum pump comprising:
    a pump rotor having an evacuating function section;
    a motor configured to drive the pump rotor to rotate; and
    the magnetic bearing device according to claim 1, the magnetic bearing device being configured to support a rotor shaft of the pump rotor in a magnetically levitated manner.

* * * * *